United States Patent [19]

Lutz

[11] Patent Number: 4,931,678
[45] Date of Patent: Jun. 5, 1990

[54] DOUBLE-INSULATED AIR-COOLED ELECTROMOTOR FOR BARREL PUMP

[76] Inventor: Karl Lutz, Salon-de-Provence-Ring 36, D-6980 Wertheim, Fed. Rep. of Germany

[21] Appl. No.: 293,730

[22] Filed: Jan. 5, 1989

[51] Int. Cl.$^5$ .............................. H02K 9/06
[52] U.S. Cl. ............................ 310/62; 310/88; 310/89; 165/47; 165/80.3
[58] Field of Search .............. 310/42, 43, 50, 58, 310/60 A, 63, 65, 89, 62; 165/47, 80.3

[56] References Cited

U.S. PATENT DOCUMENTS

| | | | |
|---|---|---|---|
| 2,967,959 | 1/1961 | Waters | 310/63 |
| 3,502,915 | 3/1970 | Moret et al. | 310/50 |
| 3,643,119 | 2/1972 | Lukens | 310/63 |
| 3,748,507 | 7/1973 | Sieber | 310/58 |
| 3,935,909 | 2/1976 | Mabuchi et al. | 310/50 |
| 4,465,948 | 8/1984 | Oyama et al. | 310/62 |
| 4,523,632 | 6/1985 | Nobukawa et al. | 165/47 |
| 4,742,257 | 5/1988 | Carpenter | 310/62 |
| 4,811,820 | 3/1989 | Rossi | 310/62 |

FOREIGN PATENT DOCUMENTS 3514684 11/1985 Fed. Rep. of Germany.
3514685 11/1985 Fed. Rep. of Germany.
3710048 6/1988 Fed. Rep. of Germany.

Primary Examiner—Peter S. Wong
Assistant Examiner—D. L. Rebsch
Attorney, Agent, or Firm—Klein & Vibber

[57] ABSTRACT

An electromotor, in particular a drive motor for a barrel or container pump, having an outwardly encapsuled motor housing made of a material having good heat conducting characteristics, such as aluminium. The motor housing is provided on its outer side with a shield of an electrically non-conducting material. The shield is surrounded on its outer side with a mantle which forms, with the housing middle portion, a through-stream gap for the passage of cooling air. This outer mantle includes a pair of housing caps, which overlap the end-support shields of the motor housing, and between which housing caps there extends the mantle which shields the outer surface of the housing middle portion by forming the through-stream gap for the passage of cooling air. The outer shielding of the entire motor housing prevents contact with metallic parts and thereby current conducting parts of the motor by a person servicing the device.

21 Claims, 2 Drawing Sheets

DOUBLE-INSULATED AIR-COOLED ELECTROMOTOR FOR BARREL PUMP

BACKGROUND OF THE INVENTION

The invention relates to an electromotor which is mounted in a housing having two axial ends which are closed by means of axial end shields. The stator and rotor of the electromotor are sealingly mounted in the housing and the rotor is rotatably mounted in the region of one of the axial end shields. A motor shaft supports the rotor and extends through one of the axial end shields of the motor housing. An air impeller wheel is rotatably secured on the motor shaft and serves to impel cooling air. This impeller has an exterior shielding made out of non-electrically conducting material, in which the impeller wheel is housed. This outer shield defines through-stream passages for cooling air and this outer shield surrounds the motor housing for purposes of air cooling it. This shield includes a cladding made of non-electrically conducting material and covers the drive end of the motor shaft. The electromotor of the invention is particularly suitable for driving a barrel or container pump.

Electromotors of this type are generally known. They find application, for example, as drive motors for barrel pumps, hand stirrers or similar arrangements, during the operation of which the handling of the motor is generally necessary by a person servicing the device is generally necessary. In such an arrangement it is accordingly essential that appropriate protection be provided against electric shocks which might be imparted to a person contacting the motor. Depending on the type of protection rendered, such motors are classified in West Germany according to "DIN-Norms" which specifies the degree of protection they afford.

Thus certain electromotors according to one of these types require a conductor which assures that, when a contact occurs between certain parts of the motor, an electrically conducting circuit is formed with certain parts of the motor housing, and electrical charge which appears is grounded by means of the conductor, so that such a contact does not lead to a risk of electric shock for the user of the electromotor. With motors affording a different electrical insulation protection, the requirement must, on the other hand, be met that no such electrically insulated members are to be installed because of the point of view that electric charges to the housing parts can also be imparted via such insulated conductors without electrically conducting connections appearing between the inner conductors of the motor and the housing. The application of such electrical charges to the housing has in particular the drawback that, if such a motor is to operate in an explosion-endangered space, for example in a space that holds explosive gases, operating conditions may cause sparking engendered by sudden break-off or tear-off or snapping of parts which could cause an explosion. Therefore, the requirements of the last mentioned class of motors require that, also with a connection of electrically conducting parts with any kind of metallic motor parts, the housing parts which are subject to being touched hold no electric charge. Moreover, with devices of this class of housing there must also be insured that no electrostatic charge is present, such as, for example, an electric charge that may build up during the friction caused by cleaning the present.

There is disclosed in West German patent application No. 30 12 715 an explosion-protected electromotor with a pressure-secured encapsuled metallic housing. This motor housing is provided with a double protective insulation whereby all contactable, respectively externally facing metallic parts, have an insulation which is provided in addition to the conventional insulations. This additional insulation takes the form of an inner cladding of the motor housing formed by an insulating synthetic coating and a corresponding cladding of the motor shaft, as well as a shielding of the shaft-through-passages by means of the air impeller wheel being made out of synthetic material which is mounted on the motor shaft. The electrical connection means and switch housing are also clad in a similar manner as the insulating motor housing in their interior sides with insulating synthetic material coatings in a pressure-proof manner.

With the aforedescribed known electromotor, it is assured that the auxiliary insulation in the form of synthetic coatings are not damaged, so that parts contacted by the person servicing the device are not electrically charged. However, it has been found problematic to provide on the one hand the rather cumbersome construction for such an electromotor and, on the other hand, to overcome the problems concerning heat conduction, towards the exterior which arise due to the inner cladding of the housing being made of synthetic material.

It is known from West German patent application No. 35 14 685 to provide an electromotor which is mounted within a housing made of synthetic material which has a dividing cross-sectional member. The housing encloses the motor at a predetermined distance and has end caps which define, in the region of these caps, through flow openings providing passage for cooling air. The cooling air is transported by an impeller wheel which, on the side opposite to the drive side of the motor, is arranged outside the motor housing proper but nevertheless within the housing made of synthetic material. The motor is mounted within the synthetic housing in such a way that an air gap is formed for conduction of the cooling air, which gap surrounds the motor.

The motor disclosed in the aforementioned West German published publication No. 35 14 685 is a so-called "trunk-motor" with exterior air cooling, which is adapted for driving a cement mixer or the like but is not suitable as a drive motor for arrangements wherein an explosion-endangered environment exists or for transporting fluids which produce explosive vapors.

Such a known motor is particularly unsuitable as drive means for a barrel or container pump.

SUMMARY OF THE INVENTION

It is therefore a general object of this invention to provide an improved electromotor of the aforedescribed type, which by means of a simple construction meets all of the operational requirements of a motor operating in an explosion-endangered environment and in particular is suitable as a drive motor for barrel or container pumps. Such pumps are generally used for transporting combustible or corrosive fluids.

The object of the invention is achieved by encapsulating the motor housing and the motor with a double-protective-insulation. The outermost cover of the shielding comprises a supporting shield which covers the housing cap and a mantle which extends between the housing cap and the housing middle portion and forms a number of through-streaming gaps for permitting the passage of cooling air. The air impeller wheel is mounted on the drive side of the motor housing through which a shaft stub of the motor shaft extends. This impeller wheel is received within the housing cap which surrounds the support shield on the drive side. Streaming paths for the cooling fluid extend outwardly for the passage of cooling air, which are formed by the housing cap surrounding the impeller wheel. The through-streaming gaps are in flow-communication, defined by the middle housing portion and the mantle which surrounds the latter and lead in an axial direction into streaming communication channels, which abut against the mantle on the drive side, and these streaming channels extend substantially axially.

There is provided with the motor in accordance with this invention a motor housing in which all metallic parts, which may be damaged as a result of a malfunction of the insulation and thereby become electrically charged, are connected within the outer shield which consists with electric non-conducting materials, thereby eliminating a contact with such motor parts. The cooling air, which is transported by means of the air impeller wheel mounted in the housing cap, streams in a direction substantially parallel to the axial direction, on the drive side, that is on the side that is remote from the side at which a servicing person would generally be located. This is particularly significant when using the motor of the invention as drive means for barrel or container pumps, in view of the fact that the fluids which are transported in such an environment produce rising vapors which may be explosive and/or corrosive. Obviously, such fluids should not be proximate to the persons servicing the device. The construction of the air impeller wheel as an axial air rotor has proven to be advantageous, which has led to a simple construction of the motor and to an advantageous conduction of the cooling air.

According to a further feature of the invention the shovels forming part of the impeller wheel can, as seen in an axial direction, be disposed, immediately adjacent in the peripheral direction, to an air ring guide. The shovels can mutually overlap each other to a limited extent, so that accidental contact with metallic parts o the motor are limited by means of the impeller wheel grating guard.

Also of interest for an advantageous cooling-air guiding is another further constructional detail. In the latter the reception chamber for the air impeller wheel is radially limited by means of a smooth air guide ring which is mounted in the housing cap and which is overlapped by the downstream side support shield. This smooth air guide ring surrounds the impeller wheel at a predetermined play distance. For the purpose of obtaining an advantageous conversion of streaming energy into steady pressure energy the downstream side section of the air guide ring can be formed as a radially widening diffuser. This construction can, furthermore, have a sudden stepwise radially cross-sectionally widening portion mounted at the downstream side of the air-guide-ring, which provides a downstream flow passage for the cooling air, thereby forming a ring diffuser.

Again for the purpose of obtaining favorable streaming conditions, there can, in accordance with a further feature of the through-streaming-gap, be arranged between the housing middle portion and the mantle enclosing same, which is made out of electrically non-conducting material, a plurality of ribs which extending substantially parallel to the motor shaft and in the peripheral direction are supported at the housing middle portion, which ribs limit and define the passages of the mantle. Such a construction of the mantle, which surrounds the housing middle portion, has ribs which are supported on the exterior of the housing middle portion. Such an arrangement leads to an extraordinarily stable mounting construction of the mantle of the housing middle portion. Such a construction is able to withstand blows within certain design limits that must be considered for the intended use of the device.

Another advantageous construction of the invention provides that between the housing cap, which is spaced from the air impeller wheel, and the mantle, which surrounds the housing middle portion, there are arranged cooling air inlet slits, which lead into the through-streaming gap disposed between the housing middle portion and the mantle. Thereby a through-streaming of the cooling air guiding is provided by means of the streaming paths which extend from the cooling air-inlet slits up to the preferably substantially axially directed path that leads from the downstream side of the housing cap outwardly.

Moreover, a further constructional feature of the invention resides in that in the region of the aforementioned cooling air-inlet slits there is provided in a simple manner a prevention against the danger of contacting electrically conducting housing portions, in that the housing cap which is remote from the air impeller wheel has a flange made out of synthetic material which extends beyond the cooling air-inlet slits in an axial direction and forms a cylindrical ring-flange. This flange surrounds the adjacent edge region of the housing middle portion and also overlaps at a gapped distance of the mantle which surrounds the housing middle portion.

In still another embodiment of the invention the housing cap includes a housing for connecting means. This housing cap is remote from the air impeller wheel mounted on the motor shaft and is constructed as a switch housing which is outwardly sealed. Advantageously, the housing cap which is remote from the drive side, includes a switch housing which encloses and is securely fastened to the housing middle portion and consists of a metallic basic body which is covered on its exterior with a synthetic coating forming an effective electric insulation of the metallic basic body.

Despite the fact that the double insulation of the motor can be constructed differently, it has been shown to be advantageous and within the framework of the invention, if the metallic basic body remote from the drive side of the housing cap, includes hollow spaces for receiving mounting screws or the like in the corresponding synthetic material sprayed on coatings. This sprayed on coating is provided on the housing cap. Thereby the synthetic material sprayed on coatings on the aforementioned hollow spaces are advantageously form-lockingly anchored in the hollow spaces and such screws do not come into contact with the basic body. By means of these measures one dispenses with the normally required use of insulating sleeves. In the same manner one can provide a grip for guiding the motor connected by means of mounting screws, which make no contact with the basic body, by means of synthetic sprayed coatings in the hollow spaces in the metallic basic body. These screws nevertheless are firmly connected with the housing cap.

A still further particularly important feature of the inventive arrangement resides in that the outwardly sealed switch housing is pressure-proof encapsulated and between the switch housing and the adjacent support shield a heat-protective plate is arranged which reduces the thermal load on the switch mounted inside the switch housing, the switch being securely mounted on the heat-protective plate.

In a still further variation of the arrangement of the invention there can be provided in a known manner, that the screening for the support shields and the housing middle portion is provided on its exterior side with an electrically conducting layer, which prevents the appearance of electrostatic charges, respectively provides for a safe grounding. Such a layer can be in the form of a soot-embedded layer in the outer zones of the shielding. Alternatively, there can also be used a homogeneous synthetic material, respectively, a sprayed on synthetic material which covers the mantle which encloses the housing middle portion on the outer side and which grounds the housing caps which extend over the support shields, thereby removing any electrostatic charges. Advantageously, the mantle which surrounds the housing middle portion and the housing cap and respectively the sprayed on coating of the housing cap which is remote from the drive side and consists of synthetic material, has a current flow resistance of about $10^8$ Ohm and a surface skin-effect resistance which equals or is larger than $10^9$ Ohm.

It is further within the framework of this invention and has proven to be advantageous when both housing caps are axially securely joined to the mantle received therebetween by means of secured insulating sleeves, made of non-electrically conducting material and mounted on the housing middle portion by threaded bolts and nuts mounted in such a manner that the bolts and nuts cannot be lost by being screwed home in an axially secure manner.

BRIEF DESCRIPTION OF THE DRAWINGS

With these and other objects in view which will become apparent in the following detailed description, the present invention, which is shown by example only, will be clearly understood in connection with the accompanying drawings, in which.

DETAILED DESCRIPTION

Figure 1:
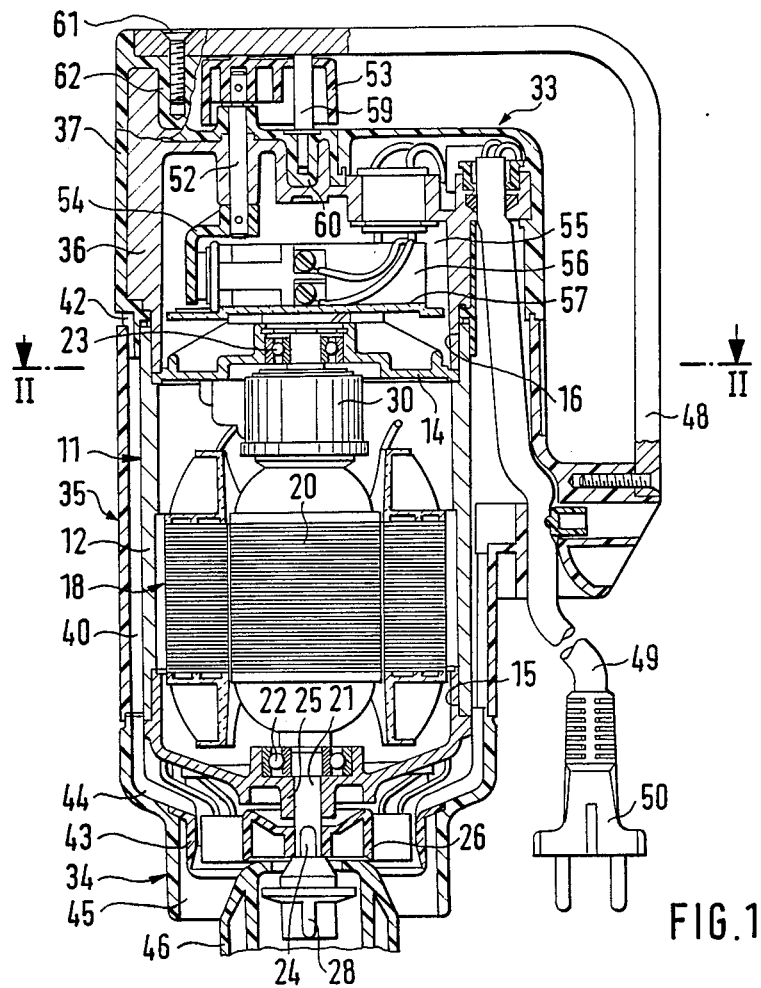
FIG. 1 is a cross-sectional view along the line I—I of FIG. 2 which line passes through the longitudinal axis of the motor and through the housing caps mounted at both axial ends thereof.

The embodiment illustrated in the drawing includes a motor 10 for driving a non-illustrated barrel pump. The housing 11 for the motor 10 can, for example, be made out of cast aluminum. This housing 11 includes a middle portion 12 and two sealing support shields 13, 14 which are mounted at opposite axial ends of the housing 11. Both support shields are, in a known manner, mounted on mating machined cylindrical surfaces 15, 16, respectively, of the housing middle portion 12. Within the housing middle portion 12 threaded bolts 17, which extend through the stator 18, securely fasten the stator on the drive-side support shield 13.

The rotor 20 is axially mounted on the motor shaft 21 which in turn is rotatably mounted in each one of two oppositely mounted roller bearings 22, 23 which are respectively mounted in the support shields 13, 14.

On the drive side of the arrangement there extends the motor shaft 21 with a shaft stub 24 extending through hub 25 of the support shield 13. The stator 18 is secured on the support shield 13 by way of the bolts 17. An air impeller wheel 26 is securely mounted on the stub 24 for transporting cooling air. The impeller wheel 26 is mounted on the drive side of the motor housing 11 immediately adjacent to the hub 25. This wheel 26 is made of an electrically non-conducting material and serves for transporting cooling air. The stub 24 axially extends from the motor housing 11. The free end of the stub 24 of the motor shaft 21, which extends axially on the drive side, is operatively connected to a non-illustrated barrel pump via a rapid coupling device 28 for coupling the drive shaft 21 to this non-illustrated barrel pump. This rapid coupling device 28 is also made out of non-electric conducting material. The rapid coupling device 28 forms simultaneously an insulating shield for the motor shaft 21.

The commutator arrangement is mounted in the region of the support shield 14 which is remote from the air impeller wheel 26. This commutator arrangement is arranged coaxially with respect to the rotor 20 and is securely mounted on the motor shaft 21 at the end that is remote from the rapid coupling arrangement 28. The commutator arrangement comprises a connector 30 mounted on the shaft 21, whereas the brush holder 31 supports the carbon brushes 32 which bear against the collector 30 and are mounted inside the housing on the support shield 14. The commutator arrangement is essentially conventional and needs not to be described in further detail.

The motor housing 11, which comprises the pipe-shaped middle portion 12, and has respectively mounted on the drive side and collector side each a support shield 13, 14, is fully screened by means of housing caps 33, 34, which are respectively mounted at the opposite axial ends of the middle portion 12. The middle portion 12 is surrounded by a mantle 35 so that this middle portion 12 is fully screened on its exterior peripheral surface. The housing cap 34, which is mounted on the drive side, and the mantle 35 consist of electrically non-conducting material, whereas t he housing cap 33, mounted on the collector side, is made of a metallic basic body 36, which has a sprayed on coating 37, also made of electrically non-conducting material. Therefore there is provided a screen for the entire exterior surface of the arrangement, which is effective in such a way that when the motor 10 is operated as intended, no contact between the metallic parts of the motor housing capable of electrically conducting can be made, as these parts can not be touched. The housing cap 34 and the mantle 35 which surround the housing middle portion 12, which are made of non-conducting material, are preferably made out of rugged synthetic material which, as does the sprayed on coating 37 on the metallic basic body 36 of the housing cap 33, is provided for grounding of electrostatic charges either from the exterior with an electrically conducting layer or the arrangement is constructed for an entire grounding of the electrostatic charges. Thus soot particles can be embedded in these parts, which is per se known and does not require any further description.

The metallic basic body 36 of the collector-side housing cap 33 has a cylindrical connecting flange 38, which extends into the machined cylindrical receiving portion 16 of the housing middle portion 12 up to a stop surface of said cylindrical machine portion 16 which also receives &he support shield 14. A similarly constructed cylindrical flange 39 made out of synthetic material, surrounds from the outside the collector-side edge of the housing middle portion 12 up to the cross-sectional plane formed by the support shield 14.

The mantle 35, which screens the housing middle portion 12 on its outer surface, surrounds this housing middle portion 12 at predetermined distance therefrom, thereby forming a through-streaming gap which extends parallel to the longitudinal axis of the arrangement 40. This mantle 35 is provided with a plurality of radially extending ribs 41, spaced from each other, which abut against the outer side of the housing middle portion 12 and limit in an axis parallel direction the through-streaming gap 40 which extends between the mantle 35 and the housing metal portion in the peripheral direction. In the region of the collector-side supporting shield 14 the mantle 35 extends axially over the corresponding edge region of the housing middle portion 12, thereby overlapping from the outside the outer edge surface 39 of the collector-side housing cap 33. Cooling air-inlet slits 42 are formed between the corresponding ends of the mantle 35 and the edge flange 39 of the housing cap 33, which is made out of synthetic material. These through-streaming gaps 40 lead into the space between the housing middle portion 12 and the mantle 35 surrounding it at a predetermined distance.

The housing cap 34, which covers as an outer shield the drive-side support shield 13, abuts directly against the mantle 35 surrounding the housing middle portion 12. By means of this housing cap there are formed streaming channels 44 for cooling air forming a streaming communication with through-stream gaps 40, disposed between the housing gap 12 and the mantle 35 surrounding it. The air impeller wheel 26 has a plurality of equidistantly spaced guide blades and the like, oriented essentially in an axial direction towards a guide grating screen 45 mounted at the drive-side end of the housing cap 34. The streaming paths are guided by the housing cap 34 which receives inside of it the air impeller wheel 26, which is surrounded by a smooth air guide ring 43, which surrounds the impeller wheel 26 with radial play. The air guide ring 43 possesses on the outlet side a radial widening which thereby forms a diffuser. There abuts against the air guide ring 43, in the streaming direction, a cross-sectional widening which acts as a spring diffuser. Moreover, there is arranged on the drive side relative to the impeller wheel 26 a shield 46 for the drive-side shaft stub 24 of the motor shaft 21, which surrounds the rapid coupling arrangement 28. This shield 46 is bell-shaped and firmlY joined to the housing cap 34 in a manner not illustrated in detail. The rapid coupling arrangement 28 is also made of a non-conducting material.

Figure 2:
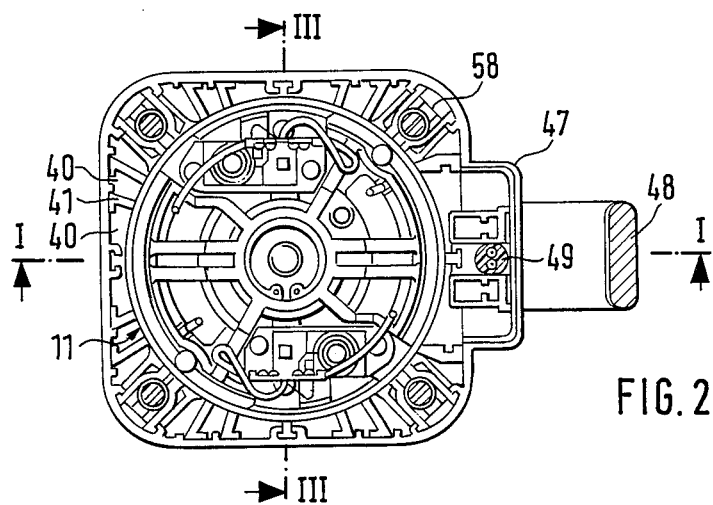
FIG. 2 is a cross-sectional view along line II—II in FIG. 1 through a motor in the region of the support shield which is remote from the drive side of the arrangement.
Figure 3:
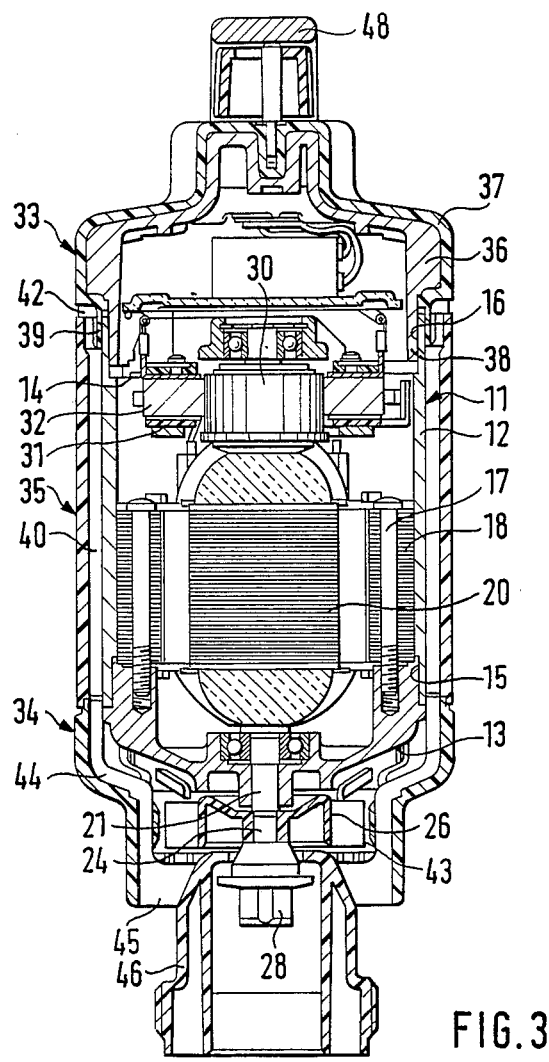
FIG. 3 is a cross-sectional view along line III—III in FIG. 2 which is 90° angularly turned from the view of FIG. 1 and oonstitutes an other cross-sectional view through the middle longitudinal axis of the motor.

The mantle 35 which surrounds the housing middle portion 12 and is spaced therefrom a predetermined gap distance for the formation of through-stream gaps 40 is, in cross section, rectangularly shaped with rounded corners (see FIG. 2). This mantle 35 is provided, in the region of its exterior surface, with a channel 47 that extends from the collector-side along about half the length of the housing middle portion 12. This channel 47, which is formed by means of a console, supports one end of a handle 48, screwed thereon (see FIG. 1), for manually guiding the motor during operation. In this channel 47 there is also housed a cable 49 which forms the electrical power connection and has at its free end a plug 50. The cable 49 extends outside of the housing cap 33 and is, in the region of the console, secured by means of a clamping shell 51, thereby permitting a certain predetermined maximum tensional pull to be exerted on the cable 49 without damaging the arrangement. The current-conducting wires of the cable 49 ar well known in the art and have not been described in detail. Suffice it to point out that the coupling and switch housing of the housing cap 33 is constructed so as to provide an electric power supply connection to the current-conducting parts of the motor.

In the region between the end remote from the collector-side support shield of the housing cap 33 and the handgrip joined thereto a rotatable grip portion 53 is mounted about a support pin 52. This rotatable grip portion 53 is also made of an electrically non-conducting material. The support pin 52 is rotatably mounted in a bore formed by the housing cap 33 and is torsion-resistantly connected with an actuating element 54, mounted inside the housing cap 33, which is operatively connected to a switch 56 arranged in the switching housing 55. The switch 56 is mounted on a thermically shielded heat-shield plate 57, in the sealing support shield 14.

For purposes of a simple and cost-saving construction and for providing a full double protective insulation all screws accessible from the outside are fully insulated relative to the metallic motor parts. Thus theY serve for joining the housing caps 33, 34 with the motor housing 11 at the housing middle portion 12 via transverse non-illustrated recesses at both ends of the ribs 41, on which there are hung insulating sleeves 58, made out of synthetic material, into which are embedded nuts and therein threadably mounted bolts which, as do the nuts, make no contact with the metallic motor parts. Also, the rotatable grip portion 53 for actuating the switch 56 and the mounting means for the handle 48 make no metallic contact whatsoever with the basic body 36 of the collector-side housing cap 33. For the mounting of the rotatable grip portion 53 there serves a pivot pin 59 which is received at one of its ends by an injection-molded portion made of synthetic material disposed in a corresponding hollow space of the metallic base body 36. In the same manner a bolt 61 for mounting the end of the handle 48, which adjoins the rotatable grip portion 53, is also threadably mounted in an injection molded part 62 disposed in the base body 36. The threaded bolt or screw 61 is mounted without making metallic contact with the base body. The hollow chambers formed on the base body 36 of the housing cap 33 which are made by injection molding techniques are form-lockingly mounted on the corresponding base body portions in a suitable fashion. For this purpose the hollow chambers made by injection molding techniques can have rear cuts or can be provided with threads which do not form an essential part of the invention and are therefore not illustrated in detail.

For certain applications of the described and illustrated electromotor 10 it can be serviced by a person holding the handle grip 48. During such operation of the motor the air impeller wheel 26, which is mounted on the drive side shaft stub 29, sucks cooling air through the inwardly extending slits 42 between the collector-side housing cap 33 and the mantle 35 which surrounds the housing middle portion 12. These cooling air streams between the mantle 35 and the housing middle portion 12 flow via the through-stream gap 40 and via the outlet stream paths 44, which are essentially axially directed out of the drive-side housing cap 34 and are fed out of the outlet stream-side guide grating screen 45. The cooling air guiding therefore is located on the side which is directed away from the person servicing the device. This circumstance is of particular significance when the motor is, for example, used as a barrel pump motor and transports those mediums that generally are transported by such barrel pumps, which mediums can, under certain circumstances, produce toxic vapors.

The complete screening of all metallic parts of the motor from contact from the outside also assures that a person servicing the device receives no electric shocks. If an insulation of the current-conducting parts in the motor interior and/or in the switch, respectively connection housing, is damaged and thereby during the operation of the motor electric charges appear in the motor housing proper the person servicing the device is completely shielded. Similarly, the grounding of any electrostatic charges by means of the special construction of the interior screening of the motor housing is assured.

Although the invention is described and illustrated with reference to a single embodiment thereof, it is not to be expressly understood that it is in no way limited to the disclosure of such preferred embodiment but is capable of numerous modifications within the scope of the appended claims.

What I claim is:

1. An improved shielding for an electromotor having a motor housing which is sealed at both of its axial ends by means of a pair of support shields, a stator, and rotor operatively mounted in said motor housing, wherein the interior of the motor housing is sealingly closed and the rotor is rotatably mounted in the region of one of the support shields of said pair of shields by means of a motor shaft axially extending from said rotor and rotatably mounted and extending through one of the support shields of said pair of shields outside of the motor housing, an air impeller wheel is coaxially mounted on said support shaft outside the motor housing for transporting cooling air, said air impeller wheel includes an outer shield made out of electrically nonconducting material in which the air impeller wheel is coaxially and operatively mounted, said outer shield surrounds the motor housing at a predetermined distance and thereby forms of through-stream paths for cooling air for the motor housing so as to externally cool it, and electrically nonconducting cladding means mounted on the drive-side end of the motor shaft, said electromotor being adapted as a drive motor for a barrel or container pump, the improvement comprising a motor housing being encapsulated with double-protective electric insulation means, wherein said electric insulation means comprise an exterior shield which includes a pair of support shields respectively mounted at opposite axial ends of said motor housing, said electric insulation means further include a pair of housing caps operatively mounted at each axial end of said motor housing and between which latter pair there extends a housing middle portion which is spaced from the motor housing, a mantle extending between said pair of caps, said mantle and housing middle portion defining a through-stream passage therebetween for the flow of cooling air, said impeller wheel is coaxially mounted on a shaft stub of said motor shaft, said stub extends outside of the motor housing at its drive-side and is disposed within the housing cap, one of said pair of caps overlap the corresponding support shield received therein and by means of this overlapping housing cap an outwardly directed streaming path for the cooling air is defined extending from the impeller wheel through said one housing cap, which outward streaming path is partially formed by said through-stream passage between said housing middle portion and said mantle surrounding same, which path is in streaming communication with an air inlet means in said electric insulation means and has outlet means on the drive side of the electromotor directed in a substantially parallel axial direction.

2. Electromotor according to claim 1, wherein said impeller wheel is formed as an axial impeller.

3. Electromotor according to claim 2, wherein said plurality of blades of the impeller wheel, as viewed in an axial direction, are formed by closely adjacent shovels which mutually to a limited extent, overlap in the peripheral direction of the impeller wheel.

4. Electromotor according to claim 3 wherein said outer shield defines a receiving chamber for the air impeller wheel, said receiving chamber is radially limited by a smooth air guide ring which is disposed within the support shield and which overlaps the housing cap on the drive-side, said air guiding ring surrounds the impeller wheel with a concentric play.

5. Electromotor according to claim 4, wherein said air guide ring has a stream-side suction which is formed as a radially widening diffuser.

6. Electromotor according to claim 5, wherein said air guide ring has an outlet side which includes a radially widening cross-section for the outlet streaming passage of cooling air, said widening cross-section adjoins the air guide ring, and forms a spring-diffuser.

7. Electromotor according to claim 6, wherein the through-stream passage serves for conducting cooling air between the housing middle portion and the mantle surrounding it in a direction substantially parallel to the motor shaft said through-stream passage being limited in a peripheral direction by means of ribs extending inwardly from the mantle which is supported on the exterior side of the housing middle portion.

8. Electromotor according to claim 7, wherein there are arranged cooling air-inlet slits between the housing cap, which is remote from the air impeller wheel and the mantle which surrounds the housing middle portion, which through-stream passage extends between the mantle and the housing middle portion.

9. Electromotor according to claim 8, wherein the housing cap which is remote from the air impeller wheel includes a cylindrical flange made out of synthetic material, which extends axially over said cooling air inlet slits and is overlapped in turn at a predetermined distance thereof by said mantle which surrounds said housing middle portion.

10. Electromotor according to claim 1, the housing cap of which is remote from the air impeller wheel and which in turn is mounted on said motor shaft and is formed as an adjoining housing and includes an outwardly closed switch housing.

11. Electromotor according to claim 10, wherein said housing cap which is remote from the drive side includes a metallic base body which surrounds said switch housing, said switch housing is connected to the housing middle portion and includes a synthetic sprayed-on coating which covers the exterior surface of the base body.

12. Electromotor according to claim 11, wherein said metallic base body of the housing cap includes a plurality of hollow chambers formed by injection molded synthetic material, said synthetic material is firmly mounted on said metallic base body, and said plurality of chambers receive therein mounting screws or the like, whereby said screws do not contact said metallic base body and the injection molded aforementioned hollow chambers are form lockingly mounted on the metallic base body.

13. Electromotor according to claim 12, including a grip for guiding the motor, said grip is firmly mounted on the housing cap by means of hollow chambers formed by means of injection molded synthetic material on said metallic base body of the housing cap by means of mounting screws which do not come into contact with the metallic base body.

14. Electromotor according to claim 13, wherein said switch housing is outwardly sealed by means of pressure proof encapsulation.

15. Electromotor according to claim 14, wherein between the switch housing and the adjoining support shield there is arranged a heat insulation plate.

16. Electromotor according to claim 15, wherein a switch 56 is mounted for switching on and off the motor in said switch housing, said switch housing being mounted on the heat insulation plate.

17. Electromotor according to claim 16, wherein the housing middle portion is surrounded on its outer side by means of said mantle and the pair of support shields are overlapped by said pair of housing caps, which housing caps are provided with an electrically conducting layer for grounding the electrostatic charges that form thereon.

18. Electromotor according to claim 17, wherein said coating on said mantle and on the pair of housing caps consist of a soot embedded coating disposed in the outer zones of the aforementioned parts.

19. Electromotor according to claim 18, wherein the housing middle portion is surrounded o its outside by said mantle and the pair of housing caps which overlap the support shields consist of an electrostatic charge conducting homogeneous synthetic material, respectively, a sprayed-on coating of such synthetic material.

20. Electromotor according to claim 19, wherein said mantle and the pair of housing caps, respectively, the sprayed-on coating of the one housing cap consists of synthetic material having a transversing resistance of about $10^8$ Ohm and surface resistance of $10^9$ Ohm.

21. Electromotor according to claim 20, wherein both housing caps of said pair of housing caps are connected with the therebetween extending mantle by means of firmly mounted insulating sleeves made out of electrically non-conducting material which are mounted on the housing middle portion by means of screwed-in mounting bolts and safety nuts which are mounted so as not to fall out from their mounting and which axially firmly connect the aforementioned parts.

* * * * *